United States Patent
Tsirkin (10) Patent No.: US 11,693,722 B2
(45) Date of Patent: Jul. 4, 2023

(54) FAST MEMORY MAPPED IO SUPPORT BY REGISTER SWITCH

(71) Applicant: Red Hat, Inc., Raleigh, NC (US)

(72) Inventor: Michael Tsirkin, Lexington, MA (US)

(73) Assignee: Red Hat, Inc., Raleigh, NC (US)

( * ) Notice: Subject to any disclaimer, the term of this patent is extended or adjusted under 35 U.S.C. 154(b) by 494 days.

(21) Appl. No.: 16/826,643

(22) Filed: Mar. 23, 2020

(65) Prior Publication Data
US 2021/0294686 A1 Sep. 23, 2021

(51) Int. Cl.
G06F 11/07 (2006.01)
G06F 9/455 (2018.01)
G06F 9/54 (2006.01)
G06F 12/0882 (2016.01)
G06F 9/30 (2018.01)

(52) U.S. Cl.
CPC ...... *G06F 11/0712* (2013.01); *G06F 9/30098* (2013.01); *G06F 9/45558* (2013.01); *G06F 9/542* (2013.01); *G06F 11/0772* (2013.01); *G06F 11/0793* (2013.01); *G06F 12/0882* (2013.01); *G06F 2009/45579* (2013.01); *G06F 2009/45583* (2013.01); *G06F 2009/45591* (2013.01)

(58) Field of Classification Search
CPC ............ G06F 11/0712; G06F 11/0772; G06F 11/0793; G06F 9/30101; G06F 9/30105; G06F 9/45558; G06F 2009/45575; G06F 2009/45579; G06F 2009/45583; G06F 2009/45591; G06F 9/542; G06F 12/0882
See application file for complete search history.

(56) References Cited

U.S. PATENT DOCUMENTS

| | | | |
|---|---|---|---|
| 8,438,363 B1 | 5/2013 | Koryakin et al. | |
| 9,086,981 B1 * | 7/2015 | Tati | G06F 12/0882 |
| 9,846,610 B2 | 12/2017 | Tsirkin | |

(Continued)

OTHER PUBLICATIONS

Page Fault, Wikipedia, 2018, 4 pages, [retrieved on Feb. 9, 2023], Retrieved from the Internet: <URL:https://web.archive.org/web/20180513014816/https://en.wikipedia.org/wiki/Page_fault>.*

(Continued)

*Primary Examiner* — Geoffrey R St Leger
(74) *Attorney, Agent, or Firm* — Lowenstein Sandler LLP (57) ABSTRACT

The technology disclosed herein enhances a fault-based communication channel between a virtual machine and a hypervisor. An example method may include: configuring, by a hypervisor, a first memory location to generate one or more faults when accessed by a virtual machine process, wherein the first memory location is mapped to a device and a second memory location is mapped to memory; detecting, by the hypervisor, a fault caused by a first execution of an instruction of the virtual machine process, wherein the instruction comprises a reference to a register comprising the first memory location; responsive to the detecting the fault, the hypervisor performing a computing task for the virtual machine process and updating the register to comprise the second memory location; and initiating, by the hypervisor, a second execution of the instruction of the virtual machine process, wherein the second execution of the instruction accesses the second memory location.

20 Claims, 6 Drawing Sheets

(56) References Cited

U.S. PATENT DOCUMENTS

| | | | |
|---|---|---|---|
| 2007/0055837 A1* | 3/2007 | Rajagopal | G06F 12/1475 |
| | | | 711/163 |
| 2008/0005297 A1* | 1/2008 | Kjos | H04L 67/08 |
| | | | 709/223 |
| 2014/0096132 A1* | 4/2014 | Wang | G06F 9/4552 |
| | | | 718/1 |
| 2018/0107605 A1* | 4/2018 | Dong | G06F 11/073 |
| 2018/0248700 A1* | 8/2018 | Tsirkin | G06F 21/602 |

OTHER PUBLICATIONS

Memory-mapped I/O, Wikipedia, 2018, 5 pages, [retrieved on Feb. 9, 2023], Retrieved from the Internet: <URL:https://web.archive.org/web/20180521212307/https://en.wikipedia.org/wiki/Memory-mapped_I/O>.*

Pan et al., "NestCloud: Towards Practical Nested Virtualization", 2011, 9 pages.

* cited by examiner

FAST MEMORY MAPPED IO SUPPORT BY REGISTER SWITCH

TECHNICAL FIELD

The present disclosure generally relates to a computer system, and more specifically to fault based memory mapped I/O for virtual machines.

BACKGROUND

Many modern day computer systems support memory mapped input output (I/O). Memory mapped I/O (MMIO) uses the same address space to address both memory and I/O devices (e.g., network interface cards). The I/O device's memory and registers may be mapped to address values accessible to a running process. When locations in the address space are accessed by the process, the Central Processing Unit (CPU) may refer to a portion of main memory (e.g., physical RAM) and may refer to memory of the I/O device. Each of IO devices may monitor the CPU's address bus and respond to any CPU access of an address assigned to that device to connect the data bus to the desired device's hardware register. To accommodate the IO devices, areas of the address space used by the CPU must be reserved for IO and must not be available for accessing main memory.

The computer systems may use the memory mapped IO in combination with hardware virtualization that multiplexes resources of an underlying host machine (associated with a physical CPU) between different virtual machines. The host machine or "host" allocates a certain amount of its resources to each of the virtual machines. Each virtual machine may then use the allocated resources to execute applications, including operating systems (referred to as guest operating systems (OS) of a "guest"). The virtual machine may use memory mapped I/O and have a memory space that is mapped to main memory and one or more IO devices. The hypervisor may expose an IO device to the guest to permit the guest to access the IO device. When a guest address is accessed by the guest, the accessed guest address may refer to a portion of host physical memory or to memory of a host I/O device.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Modern computer systems that support hardware virtualization may provide a communication channel between a virtual machine and the hypervisor by using page faults. Page faults are a common occurrence in computer systems and may occur during normal operation when a virtual machine attempts to access a memory page that is not currently loaded in host physical memory. The page fault may be generated by a processor executing the virtual machine and may be handled by the hypervisor. The hypervisor may handle the page fault by loading the data into physical memory from a backing store. Page faults are typically handled transparent to the virtual machine and the virtual machine may be unaware that the page fault occurred or was handled by the hypervisor. For example, the virtual machine may execute an instruction and it may access a memory page and appear to execute successfully, but the instruction may cause a page fault and result in the virtual machine temporarily exiting (e.g., VMExit) and subsequently restarted (e.g., VMEnter). The hypervisor may manage the loading of the data from backing store and restart the execution of the virtual machine (e.g., VMEnter). The same instruction that caused the page fault may be subsequently re-executed transparently to the virtual machine and may proceed without another page fault because the data is now present in host physical memory.

The page fault mechanism may be overloaded to enable the virtual machine to transmit a signal to the hypervisor. This may involve the virtual machine and hypervisor agreeing on a particular memory location that when accessed causes a page fault that signals the hypervisor to perform a particular task. That memory location may be within a memory mapped IO region of memory that is mapped to a particular device. The hypervisor may detect a page fault for the particular memory location and in response may perform the particular task (e.g., a task different from loading data from backing store). Overloading the page fault mechanism may be problematic because after the page fault is handled the virtual machine may be restarted and by default will execute the same instruction that caused the page fault. This may result in the overloaded page fault providing unintended results unless the instruction is skipped (e.g., unintended duplicative signals or looping). Skipping the instruction may require that the hypervisor determines the exact length of the instruction so that the hypervisor can adjust the instruction pointer to the beginning of the next instruction. However, the exact length of the instruction is not provided by the page faulting mechanism and determining the exact length of the instruction is a computing intensive operation.

Aspects of the present disclosure address the above and other deficiencies by providing technology that enhances a fault-based communication channel between a virtual machine and the hypervisor. The technology enables the virtual machine to execute the same exact instruction without generating duplicate signals to the hypervisor. This may be done by using an instruction that includes a reference to a modifiable register instead of a static memory location. A virtual machine may update the register to store a value (e.g., first memory location) and the register may be transparently updated by the hypervisor to change the value before the instruction is executed the second time (e.g., updated to a second memory location). In an example implementation, the technology may involve configuring the first memory location to generate one or more faults when accessed by a virtual machine process. The first memory location may be mapped to a virtual or physical device and the second memory location may be mapped to memory (e.g., main memory). The hypervisor may detect a fault caused by a first execution of an instruction of the virtual machine process. The instruction may include a reference to a register (e.g., register of virtual CPU) that includes the first memory location and responsive to detecting the fault, the hypervisor may perform a computing task for the virtual machine and update the register to include the second memory location. The hypervisor may then reactivate the virtual machine, which may default to executing the same instruction that caused the fault. The second execution of the instruction may access the second memory page instead of the first memory page and avoid duplicating the fault (e.g., no duplicate signal to hypervisor). The second memory page may function as a scratch space and the effects of the second execution of the instruction on the scratch space may be ignored and discarded.

The systems and methods described herein include technical improvements to para-virtualization techniques that enable virtual machines to communicate directly with a hypervisor managing their execution. In particular, aspects of the present disclosure may reduce the complexity of implementing the communication channel between the virtual machine and hypervisor by abstracting away the details of the instruction initiating the fault from the hypervisor. As such, the hypervisor does not need to know the location or length of the instruction causing the page fault or to manipulate a pointer to the instruction. Aspects of the present disclosure may also reduce the computing resources consumed to provide a fault based communication channel by avoiding a need to skip the instruction and any corresponding instruction length decoding.

Aspects of the present disclosure may also enhance the support of user space drivers and nested virtualization which further optimize the performance, security, and efficiency of a host computer system. A user space driver may be a device driver that is executed by a virtual machine as a user space process without kernel privileges. User space processes often have limited access to communicate with the hypervisor via hypercalls and the fault based communication channel may enable more optimized communication with the hypervisor. Nested virtualization may also benefit by the technology disclosed herein and typically involves a host machine that provides multiple layers of virtualization. The multiple layers may include one or more hardware virtualization layers (e.g., virtual machines), operating system virtualization layers (e.g., containers), other virtualization layers, or a combination thereof. For example, a top level virtual machine may be executed within a lower level virtual machine and the lower level virtual machine may be managed by a hypervisor. The fault base communication channel may enable the top level virtual machine to directly signal the hypervisor without signaling the lower level virtual machine (e.g., skip the intermediate virtual machine).

Various aspects of the above referenced methods and systems are described in details herein below by way of examples, rather than by way of limitation. The examples provided below discuss the technology above applied to a host machine that implements hardware virtualization. In other examples, the technology discussed herein may be applied generally to enable a user space driver to use a fault based communication channel to interact with a kernel of a machine and the machine may or may not provide hardware level virtualization.

Figure 1:
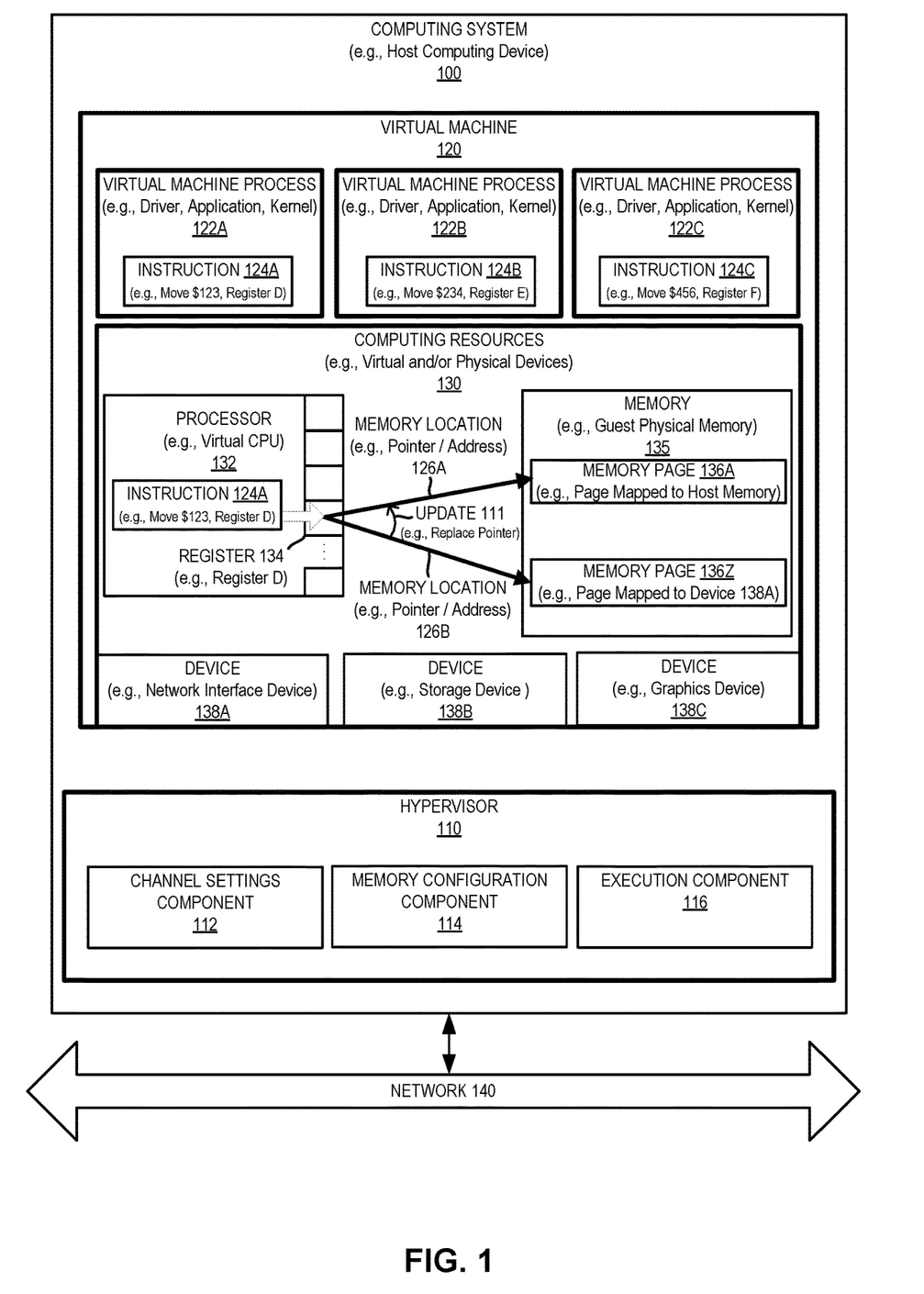
FIG. 1 depicts a high-level block diagram of an example computing system that provides a fault based communication channel between a virtual machine and the hypervisor, in accordance with one or more aspects of the present disclosure.

FIG. 1 depicts an illustrative architecture of elements of a computing system 100, in accordance with an embodiment of the present disclosure. Computing system 100 may support hardware virtualization and may execute a hypervisor and one or more virtual machines. In the example shown in FIG. 1, computing system 100 may include a hypervisor 110, a virtual machine 120, virtual machine processes 122A-C, computing resources 130, and network 140.

Computing system 100 may include a single computing device or multiple computing devices that may function as a host machine. The one or more host machines may be associated with a heterogeneous or homogenous group (e.g., cluster) and may include one or more rack mounted servers, workstations, desktop computers, notebook computers, tablet computers, mobile phones, palm-sized computing devices, personal digital assistants (PDAs), etc. It should be noted that other architectures for computing system 100 are possible, and that the implementation of a computing system utilizing embodiments of the disclosure are not necessarily limited to the specific architecture depicted. In one example, computing system 100 may be a computing device implemented with x86 hardware (e.g., Intel® or AMD®). In another example, computing system 100 may be a computing device implemented with PowerPC®, SPARC®, other hardware, or a combination thereof.

Hypervisor 110 may manage the execution of one or more virtual machines and provide the virtual machines with access to one or more underlying computing devices (e.g., hardware or virtualized resources). Hypervisor 110 may also be known as a virtual machine monitor (VMM) and may provide one or more virtual machines 120 with access to one or more features of the underlying hardware. In one example, hypervisor 110 may run directly on the hardware of computer system 100 (e.g., bare metal hypervisor). In other examples, hypervisor 110 may run on or within a host operating system (not shown).

In the example shown, hypervisor 110 may include a channel settings component 112, a memory configuration component 114, and an execution component 116. One or more features of components 112, 114, and 116 may be included in the same component, separated into different components, or a combination thereof. Channel settings component 112 may enable hypervisor 110 to identify settings to establish and operate the communication channel between virtual machine 120 and hypervisor 110. The channel settings may correspond to particular memory locations and to the register to store the memory locations. Memory configuration component 114 may enable hypervisor 110 to configure the memory so that faults are generated when a particular memory location is accessed by a process of the virtual machine. Execution component 116 enables hypervisor to detect and respond to the fault and execute the corresponding task. Components 112, 114, and 116 are discussed in more detail in regards to FIG. 2 and may be used individually or in combination to provide enhanced communication channel between hypervisor 110 and virtual machine processes 122A-C.

Virtual machine processes 122A-C may be computing processes that are executed by one or more virtual machines. Each process of the virtual machine may be managed by a guest operating system, the hypervisor 110, or a combination thereof. Each virtual machine process may include one or more processes, threads, other stream of executable instructions, or a combination thereof. A thread may be any computer based "thread of execution" and may be the smallest sequence of programmed instructions managed by an operating system (e.g., guest OS and/or host OS). As shown in FIG. 1, virtual machine processes 122A-C may include respective instructions 124A-C.

Instructions 124A-C may each be an instruction that execute as part of a respective virtual machine process and invokes a fault that signals the hypervisor to perform a particular task. Each of the instructions 124A-C may be comprised of executable data and may include or be based on assembly code, binary code, machine code, object code, executable code, bytecode, other code, or a combination thereof. Instructions 124A-C may include one or more instructions, commands, calls, operations, operands, parameters, or a combination thereof. Each instruction may be incorporated into the virtual machine process from one or more storage objects. The storage objects may include one or more file objects (e.g., files, directories), database objects (e.g., records), other storage objects, or a combination. In one example, the storage objects may include one or more executables (EXE), libraries (e.g., dynamically linked library (DLL), shared object library (SO)), other executable objects, or a combination thereof.

Instruction 124A may be a special instruction of virtual machine process 122A that is loaded into processor 132 (e.g., Virtual CPU). Instruction 124A may be configured to reference a modifiable register storing a memory location instead of including the memory location as a static value. The instruction may reference the modifiable register via a value that is an input parameter, output parameter, hard-coded parameter, other parameter, or a combination thereof. Referencing a register may be the same or similar to pointing to the register. The reference to the register may be a value that functions as a pointer to the register (e.g., register pointer) and the register may store a value that functions as a pointer to a memory location (e.g., memory pointer). Therefore, the instruction may be described as a pointer to a pointer, a reference to a pointer, pointer to a reference, a reference to a reference, other description, or a combination thereof. Including the memory location in a modifiable register is advantageous because the exact same instruction can be executed multiple consecutive times and access the particular memory location once with subsequent accesses being diverted to a scratch space that can be ignored. The operation associated with instruction 124A may correspond to any operation that can access a memory location and may be the same or similar to a move instruction, a copy instruction, a migrate instruction, a write instruction, a store instruction, a load instruction, a read instruction, other instruction, or a combination thereof. In one example, instruction 124A may be an instruction with the following format: asm volatile ("mov %1, %0":: "D"(pointer), "g"(value): "D"), wherein "asm" indicates it is an assembly operation and "mov" indicates it's a move operations that uses modifiable register "D." As shown in FIG. 1, the modifiable register may be register 134 of processor 132.

Processor 132 may be any processing device that is able to execute instructions of one or more virtual machine processes 122A-C. Processor 132 may correspond to one or more virtual processors, physical processors, other processors, or a combination thereof. Processor 132 may refer to one or more processing devices or processing units that uses a single core computer processor capable of executing one instruction at a time (e.g., single pipeline of instructions) or may be a multi-core computer processor that simultaneously executes multiple instructions concurrently. A processor may be implemented as a single integrated circuit, two or more integrated circuits, or may be a component of a multi-chip module (e.g., in which individual microprocessor dies are included in a single integrated circuit package and hence share a single socket). Processor 132 may include features of a central processing unit (CPU), graphical processing unit (GPU), a microcontroller, other computer processor, or a combination thereof. Processor 132 may implement an instruction set architecture (ISA) that functions as an interface between processor 132 and the computing processes being executed by processor 132. The instruction set architecture may be the same or similar to x86 (e.g., Intel®, AMD®), PowerPC®, Advanced RISC Machine (ARM®), Scalable Processor Architecture (SPARC®), other computer architecture, or a combination thereof. In one example, processor 132 may be a virtual central processing unit (vCPU) that is managed by the hypervisor and executes instruction 124A, which references register 134.

Register 134 may be any data storage unit that can store data that processor 132 can reference when executing instruction 124. Register 134 may be the same or similar to a control register, storage register, memory register, other data store unit, or a combination thereof. Register 134 may be one or more internal registers that are part of the processor (e.g., processor registers), external registers that are external to the processor (not shown), other registers, or a combination thereof. Register 134 may be part of a set of registers that affect a processor's behavior in regards to paging control, faults, interrupts, exceptions, addressing modes, other processor functions, or a combination thereof. As discussed above, register 134 may be associated with a virtual processor and may be a register that is accessible and modifiable by virtual machine 120, hypervisor 110, host operating system, or a combination thereof. The technology disclosed herein may use register 134 to store memory locations 126A-B.

Each of the memory locations 126A-B may function as a pointer and may include data that identifies a particular location in memory 135. The data may indicate one or more locations in the form of numeric values, alphanumeric values, binary values, other values, or a combination thereof. A memory location may be a particular point, range, area, region, or other location in memory 135. Memory location 126A-B may each consume all of the data storage or a portion of the data storage provided by register 134. The memory location stored in the register may be updated before, during, or after executing instruction 124A. In one example, register 134 may be set to memory location 126A before instruction 124A is executed (e.g., first execution) and may be modified via update 111 to store memory location 126B before instruction 124A is re-executed (e.g. second execution). Memory locations 126A-B may correspond to different locations in memory 135.

Memory 135 may be any data storage accessible to processor 132 as it executes virtual machine 120. Memory 135 may be guest memory, virtual machine memory, other memory, or a combination thereof. Memory 135 may correspond to logical memory (e.g., guest memory), physical memory (e.g., host physical memory), or a combination hereof. In one example, memory 135 may be guest physical memory and may correspond to a portion of memory assigned by hypervisor 110 to virtual machine 120. In another example, memory 135 may be guest virtual memory and may correspond to virtual memory managed by a guest operating system executed by virtual machine 120. In either example, memory 135 may be represented as one or more memory pages 136A-Z.

Memory pages 136A-Z may be logical data structures that are used to store, organize, and access data. Some of the memory pages may map to main memory of computing system 100 (e.g., host physical memory) and some of the memory pages may map to memory of one or more devices 138A-C of computing system 100 (e.g., physical or virtual peripheral devices). Having some memory pages that are mapped to main memory and some that are mapped to I/O devices may be referred to as memory mapped IO (MMIO).

Devices 138A-C may be any computing devices that are available to virtual machine 120 and can receive a request and perform a computing task. Devices 138A-C may include physical devices, virtual devices, or a combination thereof. A computing task may any task that can be performed by a physical computing device or emulated by a physical computing device (e.g., emulated by a general purpose CPU). The computing tasks may involve transmitting data (e.g., output data), receiving data (e.g., input data), processing data (e.g., transforming data), or a combination thereof. As shown in FIG. 1, device 138A may be a network interface device, device 138B may be a storage device, and device 138C may be a graphics device. Other computing devices may be used as an alternative or in addition. The network interface device may provide access to a network internal to computing system 100 or external to computing system 100 (e.g., network 140) and in one example may be a network interface controller (NIC). The storage device may include a storage controller associated with one or more mass storage devices that include solid-state storage (e.g., Solid State Drives (SSD)), hard drives, other persistent data storage, or a combination thereof. The graphics device may provide graphics processing for computing system 100. One or more of devices 138A-C may be combined into one or more physical devices (e.g., integrated devices) or may partially or completely emulated by a physical processor.

Network 140 may be a public network (e.g., the internet), a private network (e.g., a local area network (LAN), wide area network (WAN)), or a combination thereof. In one example, network 140 may include a wired or a wireless infrastructure, which may be provided by one or more wireless communications systems, such as a wireless fidelity (WiFi) hotspot connected with the network 140 and/or a wireless carrier system that can be implemented using various data processing equipment, communication towers, etc.

The virtual machine processes 122A-C discussed above may each be associated with a particular level of privilege that may be the same or similar to processor protection levels (e.g., processor protection rings). The privilege level may indicate an access level of a computing process to computing resources (e.g., memory, processor, or other virtual or physical resources). There may be multiple different privilege levels assigned to the computing processes. In one example, the privilege levels may correspond generally to a user mode (e.g., reduced privilege mode, non-root mode, non-privileged mode) and a kernel mode (e.g., enhanced privilege mode, root mode). The computing process executing in user mode may access resources assigned to the computing processes and may be restricted from accessing resources associated with kernel space or with another user mode process (e.g., other portion of user space). The kernel mode may enable the computing process to access resources associated with the kernel space and the user space. In other examples, there may be a plurality of privilege levels, and the privilege levels may include a first level (e.g., ring 0) associated with a hypervisor/kernel, a second and third level (e.g., ring 1-2), and a fourth level (e.g., ring 3) that may be associated with user space applications.

One or more of virtual machine processes 122A-C may be a user space process that executes with a user mode privilege level. The term user space process and user mode process may be used interchangeably herein. In one example, the privilege level associated with a computing process may change during execution and a computing process executing in user space (e.g., userland) may request and be subsequently granted enhanced privileges. The modification of privilege level may or may not be associated with a context switch. Each of the virtual machine processes 122A-C may include an instruction (e.g., 124A-C) that can be executed by a processor 132. In one example, one or more of the virtual machine processes 122A-C may be a user space device driver that communicates with a device using the fault based communication channel.

The user space device driver may be a device driver that can be executed by a computing process that is running at a user mode privilege level (e.g., a user space process). Driver code for the user space device driver may be loaded into user space memory of the same computing process that is invoking the driver code or into the user space memory of a different computing process. As used herein, the term user space device driver may be used interchangeably with user mode device driver. In one example, the user space device driver may be based on a data plane development kit (DPDK). The data plane development kit may be a framework that includes a set of network interface controller drivers and data plane libraries that support fast packet processing for high speed data packet networking applications. In another example, the user space device driver may be based on a storage performance development kit (SPDK). The storage performance development kit may be a framework that includes a set of storage controller drivers and libraries that support high performance storage applications. SPDK may enable storage drivers to execute in userspace to avoid system calls (e.g., syscalls), hypervisor calls (e.g., hypercalls), or a combination thereof. SPDK may enable zero-copy access from application code. SPDK may also or alternatively enable polling hardware for completions instead of relying on interrupts and avoid (e.g., reduce or eliminate) locks in the I/O path instead relying on message passing.

Figure 2:
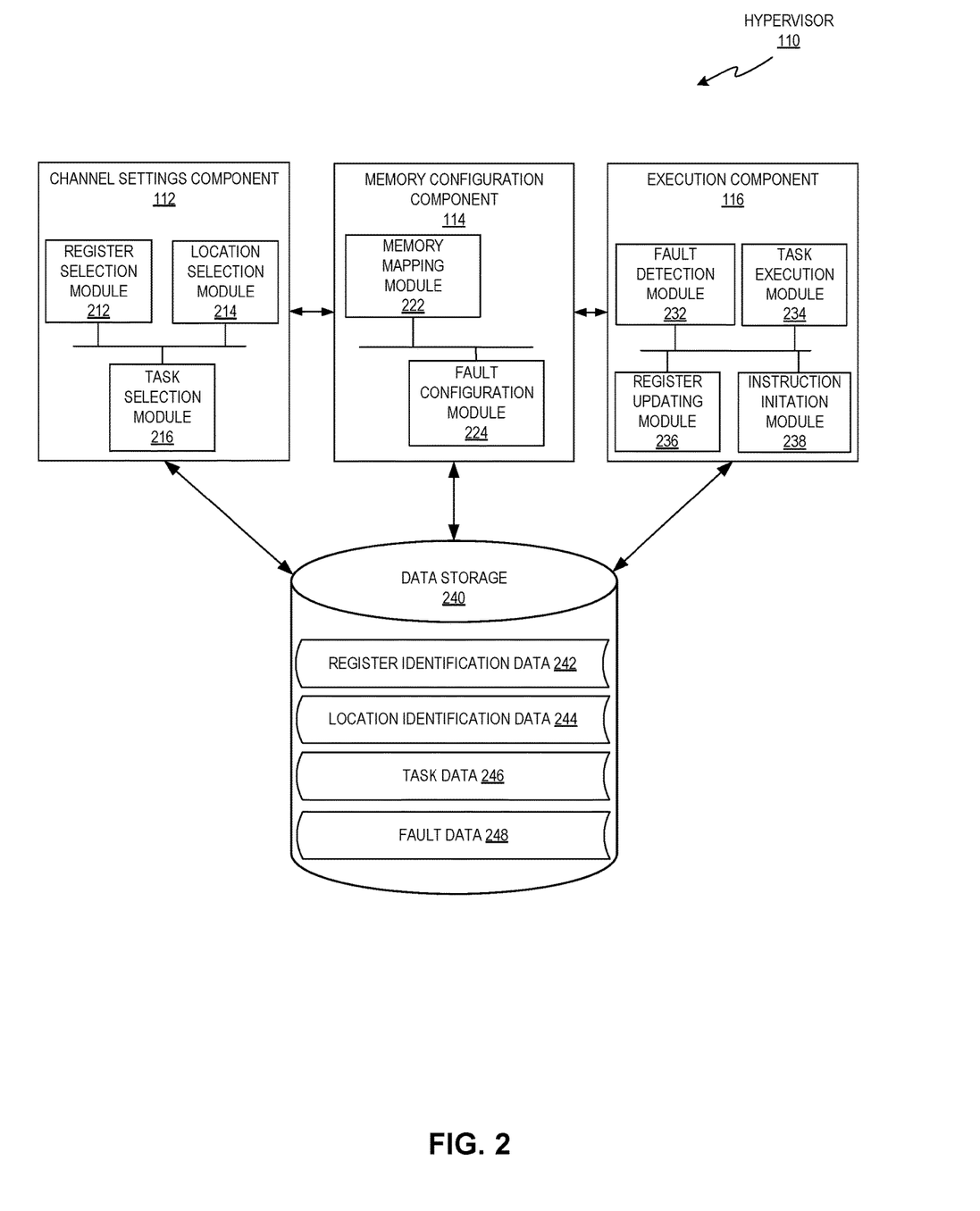
FIG. 2 depicts a block diagram illustrating components and modules of an example hypervisor, in accordance with one or more aspects of the present disclosure.

FIG. 2 depicts a block diagram illustrating an exemplary hypervisor 110 that enables one or more virtual machines to use an optimized fault based communication channel to communicate with hypervisor 110, in accordance with one or more aspects of the present disclosure. Hypervisor 110 may be the same or similar to hypervisor 110 of FIG. 1 and may include a channel settings component 112, a memory configuration component 114, an execution component 116, and data storage 240. The components and modules discussed herein may be performed by any portion of a computing device (e.g., computing device 600 discussed below). For example, one or more of the components or modules discussed below may be performed by processor hardware, processor firmware, a kernel, a driver, an application, other portion of an operating system, or a combination thereof. More or less components or modules may be included without loss of generality. For example, two or more of the components may be combined into a single component, or features of a component may be divided into two or more components. In one implementation, one or more of the components may reside on different computing devices (e.g., a first processor executing the hypervisor and a second processor executing the virtual machine).

Channel settings component 112 may enable hypervisor 110 to determine settings for establishing and operating a communication channel between a virtual machine and hypervisor 110. Settings of the channel may relate to the register being used, the memory locations being accessed, the processes and instructions being executed, the details of the fault, the computing tasks being performed, other settings, or a combination thereof. The channel settings may be selected by a process of the virtual machine or hypervisor before, during, or after design, development, compiling, linking, installation, testing, deployment, loading, initialization, runtime, other point in time, or a combination thereof. One or more of the channel settings may be selected by a compiler, linker, installer, virtual machine, hypervisor, host operating system, computer program, administrator, programmer, other entity, or a combination thereof. In one example, one or more of the channel settings may be determined by the virtual machine and provided to the hypervisor or determined by the hypervisor and provided to the virtual machine. In another example, one or more of the channel settings may negotiated and agreed upon by one or more virtual machines, hypervisors, or a combination thereof. In either example, the channel settings component 112 may include a register selection module 212, a location selection module 214, and a task selection module 216.

Register selection module 212 may enable hypervisor 110 to determine the register that will be used to store the memory location used by the instruction. The register may be a register that can be updated by the virtual machine process and can be updated by the hypervisor. In the example discussed above, the register may be a particular processor register of the virtual processor of the virtual machine (e.g., Guest vCPU). In another example, the register may be any physical, logical, or virtual memory register at any level of the memory hierarchy (e.g., L1-L3 Cache, main memory, auxiliary memory, memory swap space, etc.). In either example, register selection module 212 may determine the register and store the identity of the register as register identification data 242 in data storage 240. Register identification data 242 may include data indicating the identifier of the register, processor, virtual machine, host, process, thread, other unit, or a combination thereof.

Location selection module 214 may enable hypervisor 110 to determine the memory locations that will be stored in the register. There may be multiple different memory locations used for each particular instruction. The first memory location may correspond to a memory location that will cause the fault to be generated and may correspond to a device that supports memory mapped IO (MMIO). The second memory location may correspond to a memory location that will avoid the fault and may map to an area in main memory that the virtual machine process has access to (e.g., read, write, and/or execute access to host physical memory). One or more of the memory locations may be stored in data storage 240 as location identification data 244. Location identification data 244 may include one or more identifiers of memory addresses, memory pointers, memory devices, memory pages, memory page frames, other location data, or a combination thereof.

In one example, the instruction may cause the processor to transfer data to the first memory location and the data may be transmitted to the mapped device without being stored in main memory. In another example, the instruction may cause the processor (e.g., virtual processor) to attempt to access (e.g., read, write, or execute) the first memory location without the data being stored at the location because attempting to access the memory location may be enough to cause the fault to be generated. The second memory location may correspond to a location in main memory (e.g., host memory) and the instruction may cause the processor to transfer data to the first location and the data may be transmitted to main memory. The second memory location may be memory that was allocated as scratch space so that the instruction can complete successfully. But the data stored in the scratch space by the instruction can be ignored or discarded. The memory at the second memory location may be allocated by the virtual machine, hypervisor, host operating system, other entity, or a combination thereof and may be mapped to host physical memory and configured to enable the one or more virtual machine processes to access the memory (e.g., read, write, and/or execute).

Task selection module 216 may enable hypervisor 110 to determine a computing task to perform in response to detecting the fault that was initiated by the virtual machine process. The computing task may be related to the device that the first memory location is mapped to or may be a task that is related to a different device and unrelated to the device the first memory location is mapped to. In one example, the first memory location may be mapped to a virtual device and the computing task may involve emulating a feature of the virtual device as discussed in more detail below. The data that indicates the computing task to be performed may be stored in data storage 240 as task data 246. Task data 246 may include executable data (e.g., machine code, operations, opcodes instructions, commands), informational data (e.g., parameter values, user credentials, configuration data, settings), other data, or a combination thereof.

Memory configuration component 114 may enable hypervisor 110 to configure one or more layers of the memory hierarchy in view of channel settings data. The memory hierarchy may have multiple layers (e.g., multiple levels) and may include one or more layers for guest virtual memory, guest physical memory (e.g., guest main memory), guest processor registers (e.g., virtual CPU registers), hypervisor memory (e.g., hypervisor virtual/physical memory), host physical memory (e.g., host main memory), physical processor registers (e.g., CPU registers), other data storage layer, or a combination thereof. Memory configuration component 114 may configure the computer system (e.g., host machine) so a fault is generated when the virtual machine process attempts to access the first memory location. In one example, memory configuration component 114 may include a memory mapping module 222 and a fault configuration module 224.

Memory mapping module 222 may enable memory mapped input and output (IO) for the virtual machine, hypervisor, host operating system, or a combination thereof. Memory mapped IO (MMIO) enables the same memory address space (e.g., memory layer/level) to address main memory and IO devices (e.g., network interface cards). Memory locations within the memory address space can be mapped to data storage of the host (e.g., main memory, primary memory) and also data storage of the IO device (e.g., memory of IO device). This may enable a computing process that has access to a memory address space to perform operations at a first memory location to access data in memory of an IO device (e.g., read or write data) and perform operations on a second memory location to access data in main memory of the host. Each IO device may monitor the address bus of a processor (e.g., physical or virtual CPU) and respond to any access of an address assigned to the IO device which communicatively couples the data bus to the desired device's memory (e.g., hardware registers). To accommodate the IO devices, addresses used by the processor are reserved for IO with the device and not used for accessing main memory. Memory mapped IO may be enabled for the virtual machine, the hypervisor, the host, or a combination thereof. In one example, memory mapping module 222 may enable a first memory location in guest memory (e.g., guest physical memory or guest virtual memory) to map to an IO device and a second memory location in guest memory to map to main memory of the host computer system (e.g., host device, host machine).

Fault configuration module 224 may enable the hypervisor to configure one or more layers of the memory hierarchy to generate a fault when a particular memory location is accessed by a particular process. The fault may be generated by a virtual processor, physical processor, or a combination thereof. The fault may include one or more signals, exceptions (e.g., hardware exception or software exception), interrupts (e.g., hardware interrupt or software interrupt), traps, messages, other signal, or a combination thereof. In one example, the fault may indicate an access violation of a computing resource that has occurred or will occur. The fault may be the same or similar to a protection fault and may be or include a page fault (PF), a segmentation fault (SF), a general protection fault (GPF), other signal, or a combination thereof.

Configuring a memory location to generate a fault may involve configuring settings for the memory, virtual machine processes, processor, other construct, or a combination thereof. Configuration the memory location may be performed by the hypervisor and may involve modifying the memory settings to indicate that the status of a memory page (e.g., guest memory page) or an underlying memory page (e.g., hypervisor memory page) is unavailable. A memory location may be considered unavailable if it is write protected, reserved, not present, locked, absent, missing, overwritten, dirty, read-only, other status indicator, or a combination thereof. In one example, first memory location may be a particular memory page in guest physical memory and configuring the first memory location to cause a fault when accessed by the virtual machine process may involve the hypervisor updating a page table structure of the host CPU to mark a page table entry (PTE) that corresponds to the first memory location as unavailable.

The page table structure may be any data structure that stores mapping data that maps locations within a first address space (e.g., guest memory) to locations in a second address space (e.g., host memory). The page table structure may be used to resolve a guest address to a host address, a virtual memory address to a physical address, or a combination thereof. In some instances, a guest OS and the hypervisor may each implement memory management features that virtualize the physical memory resources of a host machine. As a result, the guest virtual memory and hypervisor virtual memory may overlap and each may have a corresponding page table structure for resolving virtual memory addresses to physical memory addresses. For example, a guest OS may use a first layer page table to map a guest virtual memory address to a guest physical memory address and the hypervisor may use a second layer page table to map the hypervisor memory address to the host physical address.

In one example, the page table structures may be a nested page table (NPT). The nested page table may enable second level address translation by including mapping data that enables a processor to resolve a guest virtual memory address directly to host physical memory addresses. The page table structure may include page table hierarchies comprising one or more page directories and one or more sets of page tables. In one example, page table structures may be the same or similar to Extended Page Tables (EPT) by Intel®, Rapid Virtualization Indexing (RVI) by AMD®, other hardware-assisted virtualization structure, or a combination thereof.

Execution component 116 enables hypervisor to process the fault and execute the corresponding task when the fault is associated with the communication channel between the virtual machine and hypervisor. In one example, execution component 116 may include a fault detection module 232, a task execution module 234, a register updating module 236, and an instruction initiation module 238.

Fault detection module 232 may enable the hypervisor to detect and analyze the fault to determine whether a computing task should be performed. Hypervisor 110 may be called to handle many faults during its normal operation. Fault detection module 232 may enable the hypervisor 110 to determine whether a current fault matches the task initiating fault. The task initiating fault is the fault that is overloaded to function as a signal to perform a computing task for the virtual machine. The fault may be generated by a processing device and the processing device may also exit execution of the virtual machine process. The execution may exit during the first execution of the instruction and subsequently be re-executed when initiated by the hypervisor.

Determining whether the current fault is the task initiating fault may involve analyzing fault data 248 that is associated with the fault. Fault data 248 may indicate one or more attributes of the fault. The attributes represented by fault data 248 may include identification data for one or more memory locations (e.g, memory pages), processes (e.g., virtual machine process), mapped data (e.g., underlying device or host memory), processor or device, machine (e.g., virtual machine, host machine), other data, or a combination thereof. Fault detection module 232 may compare fault data 248 to one or more of the channel settings data to determine if there is a match. For example, the hypervisor 110 may compare the memory location (e.g., mapped to device ABC) and process identifier (e.g., virtual machine XYZ) related to the fault with the respective first memory location and virtual machine process. If there is a match, hypervisor may proceed with task execution module 234.

Task execution module 234 may enable hypervisor 110 to perform a computing task for the virtual machine process. The computing task may be any task that benefits the virtual machine and may be different from managing the loading of data from backing store. The computing task may include one or more operations that are unavailable to the virtual machine process due to the restrictions placed on the virtual machine process. In one example, the computing task performed by the hypervisor may involve emulating a feature of a virtual device that the first memory location is mapped to. The emulation may emulate a feature of a device that is absent from the computer system or a feature that is missing from a device present on the computer system.

Register updating module 236 may enable hypervisor 110 to update the register to change the stored memory location before, during, or after performing the task for the virtual machine process. The register that stores the memory locations may be configured to be updated by the virtual machine and the hypervisor. For example, the virtual machine process may update the register to include the first memory location and the hypervisor may update the register to replace the first memory location with the second memory location. The virtual machine process may update the register before, during, or after initiating the instruction and the hypervisor may update the register after the fault occurs and before the instruction is reinitiated.

Updating the register may involve modifying the data stored in the register by using one or more operations. The operations may involve replacing, overwriting, setting, resetting, loading, reloading, writing, removing, deleting, erasing, flushing, purging, other operation, or a combination thereof. In one example, the register may be a register of a virtual processor that comprises a pointer value of the first memory location, and wherein updating the register comprises the hypervisor involves executing a clobber operation to clobber the register value with a different register value. The clobber operation may be an assembly operation and performing a clobber operation on a register may involve overwriting the register during the execution of an instruction that references the register. Wherein the duration of the execution may begin when the instruction is initiated and end when the instruction completes and may or may not be interrupted and paused at one or more instants within the duration (e.g., process exits and is re-initiated).

The hypervisor may update the register by modifying a virtual machine data structure that is loaded into the physical processor when the virtual machine process executes. The virtual machine data structure may store the states of the registers and can my modified to update one or more values in any of the register (e.g., vCPU control register). In one example, the computer system may be implemented on an Intel® x86 architecture that provides hardware assisted virtualization features using Virtual Machine Extensions® (VMX) and the virtual machine data structure may be a Virtual Machine Control Structure (VMCS).

Instruction initiation module 238 may enable the hypervisor to initiate the virtual machine process after the fault occurs. As discussed above, the occurrence of the fault may cause the virtual machine process to exit while it is executing the particular instruction (e.g., instruction 124A). The exit may enable the hypervisor to handle the fault by executing the task and updating the register. The hypervisor 110 may subsequently execute a virtualization instruction to re-enter the virtual machine, which will cause the current virtual machine process to execute the current instruction (e.g., instruction 124A). This may result in the same instruction being re-executed so that the same instruction is consecutively executed by the virtual processor of the virtual machine. In one example, the hypervisor may execute on a computer system that implements hardware virtualization (e.g., VMX) and the occurrence of the fault may be accompanied by a virtual machine exit (e.g., VM Exit) and hypervisor 110 may initiate a virtual machine enter (e.g., VM Enter) to cause the virtual machine to continue executing.

Figure 3:
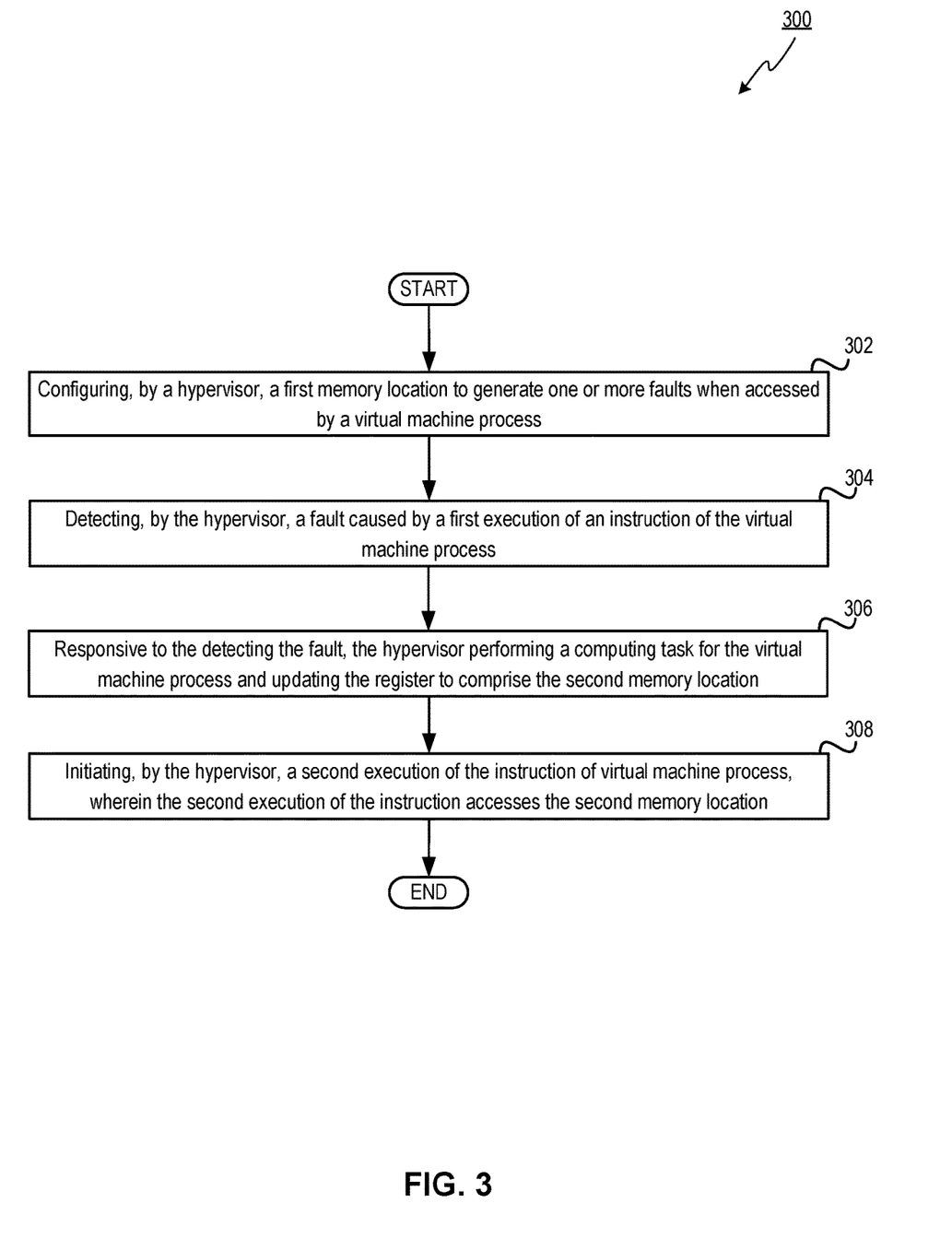
FIG. 3 depicts a flow diagram of an example method of a fault based communication channel between a virtual machine and the hypervisor, in accordance with one or more aspects of the present disclosure.
Figure 4:
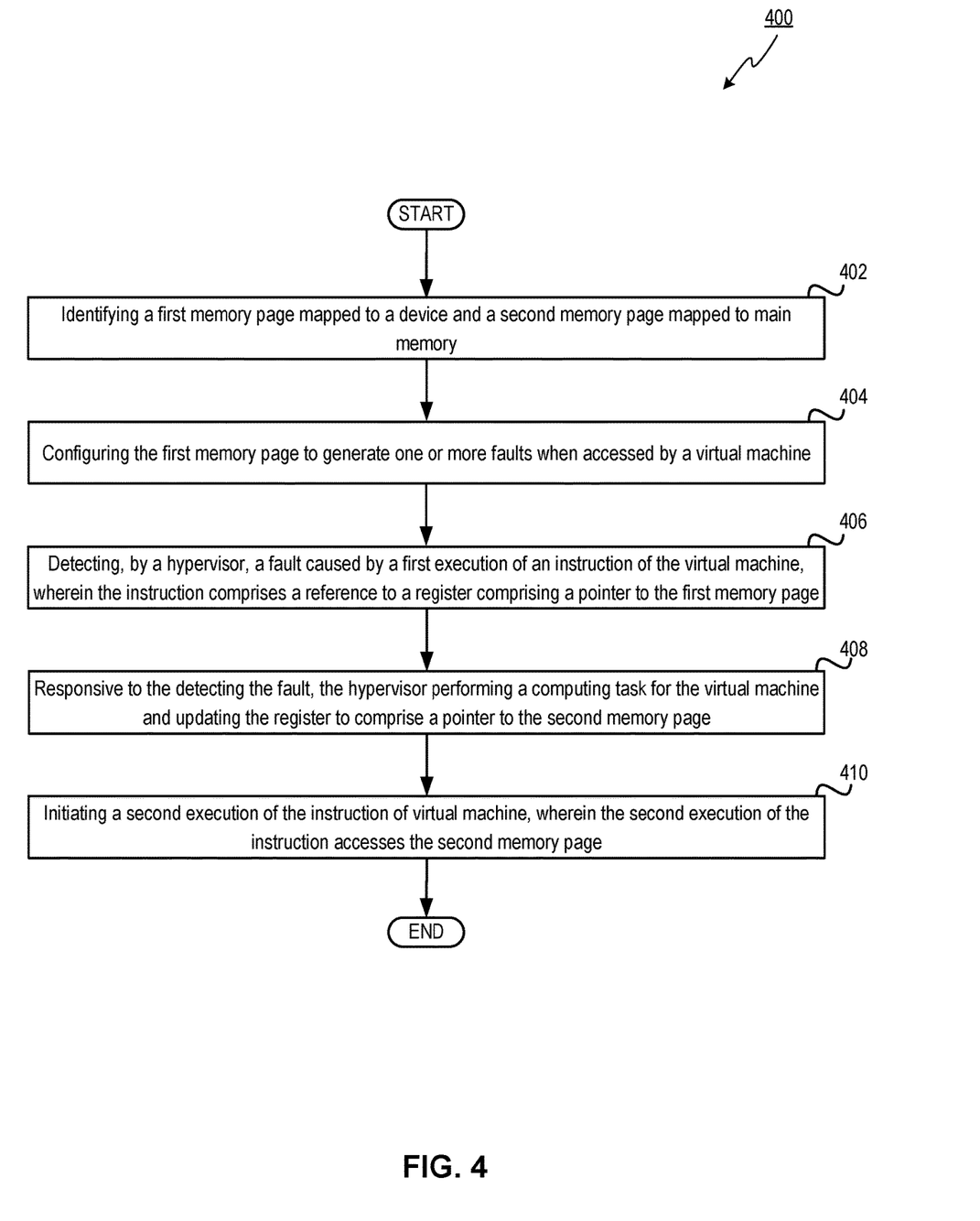
FIG. 4 depicts a block diagram of an example computer system in accordance with one or more aspects of the present disclosure.

FIGS. 3 and 4 depict flow diagrams for illustrative examples of methods 300 and 400 for establishing and operating a fault based communication channel between a virtual machine and a hypervisor. Methods 300 and 400 may be performed by processing devices that may comprise hardware (e.g., circuitry, dedicated logic, programmable logic, microcode, etc.), executable code (such as is run on a general purpose computer system or a dedicated machine), or a combination of both. Methods 300 and 400 and each of their individual functions, routines, subroutines, or operations may be performed by one or more processors of the computing device executing the method. In certain implementations, methods 300 and 400 may each be performed by a single processing thread. Alternatively, methods 300 and 400 may be performed by two or more processing threads, each thread executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, methods 300 and 400 may be performed computing system 100 of FIG. 1 or computing device 600 of FIG. 6.

Referring to FIG. 3, method 300 may be performed by a processing device of a server device or a client device and may begin at block 302. At block 302, the hypervisor executed by the processing device may configure a first memory location to generate one or more faults when accessed by a virtual machine process. The first memory location may be mapped to a device (e.g., input output (IO) device) and a second memory location may be mapped to memory (e.g., host main memory). Configuring the first memory location may involve the hypervisor updating a host page table to mark a page table entry (PTE) that corresponds to the first memory location as unavailable (e.g., non-present, reserved, or write protected).

At block 304, the hypervisor executed by the processing device may detect a fault caused by a first execution of an instruction of the virtual machine process. The instruction may include a reference to a register that stores the first memory location. In one example, the register may be a register of a virtual processor that stores a pointer value of the first memory location and the register can be updated by the virtual machine, hypervisor, or a combination thereof. In one example, the fault may be a page fault that the virtual machine process intentionally initiates to signal the hypervisor to perform the computing task for the virtual machine process.

At block 306 the hypervisor, in response to detecting the fault, may perform a computing task for the virtual machine and update the register to comprise the second memory location. Updating the register may involve the hypervisor executing a clobber operation to overwrite the pointer value of the first memory location with a pointer value of the second memory location. In one example, the first memory location may be a pointer to a guest memory page that is mapped to a virtual device to implement Memory Mapped IO (MMIO), and performing the computing task may involve the hypervisor emulating a feature of the virtual device.

At block 308, the hypervisor executed by the processing device may initiate a second execution of the instruction of virtual machine process. In one example, the first execution accesses the first memory location to signal the hypervisor to perform the computing task and the second execution accesses scratch space at the second memory location without signaling the hypervisor to perform the task. The instruction of the first execution and the instruction of the second execution may be identical and may include a reference to the register. The register may store a pointer value that is changed after the first execution and before the second execution, which causes the second execution of the instruction to access the second memory location instead of the first memory location. The first execution and the second execution of the instruction may be sequentially and consecutively executed by a virtual processor. When the fault is generated, the virtual processor and virtual machine process may exit execution before completing the instruction (e.g., first execution) and the initiating causes the virtual machine process to enter execution at the instruction to cause the second execution. Responsive to completing the operations described herein above with references to block 308, the method may terminate.

Referring to FIG. 4, method 400 may be performed by processing devices of a server device or a client device and may begin at block 402. At block 402, a processing device may identify a first memory page mapped to a device (e.g., input output (10) device) and a second memory page mapped to main memory (e.g., host physical memory).

At block 404, the processing device may configure the first memory page to generate one or more faults when accessed by a virtual machine. Configuring the first memory page may involve the hypervisor updating a host page table to mark a page table entry (PTE) that corresponds to the first memory page as unavailable (e.g., non-present, reserved, or write protected).

At block 406, the processing device may detect a fault caused by a first execution of an instruction of the virtual machine. The instruction may include a reference to a register that stores a pointer to the first memory page. In one example, the register may be a register of a virtual processor that stores a pointer value to the first memory page and the register can be updated by the virtual machine, hypervisor, or a combination thereof. In one example, the fault may be a page fault that the virtual machine intentionally initiates to signal the hypervisor to perform the computing task for the virtual machine.

At block 408 the hypervisor, in response to detecting the fault, may perform a computing task for the virtual machine and update the register to comprise the second memory page. Updating the register may involve the hypervisor executing a clobber operation to overwrite the pointer value to the first memory page with a pointer value to the second memory page. In one example, the first memory page may be a guest memory page that is mapped to a virtual device to implement Memory Mapped IO (MMIO), and performing the computing task may involve the hypervisor emulating a feature of the virtual device.

At block 410, the processing device may initiate a second execution of the instruction of virtual machine. In one example, the first execution accesses the first memory page to signal the hypervisor to perform the computing task and the second execution accesses scratch space at the second memory page without signaling the hypervisor to perform the task. The instruction of the first execution and the instruction of the second execution may be identical and may include a reference to the register. The register may store a pointer value that is changed after the first execution and before the second execution, which causes the second execution of the instruction to access the second memory page instead of the first memory page. The first execution and the second execution of the instruction may be sequentially and consecutively executed by a virtual processor. When the fault is generated, the virtual processor and virtual machine may exit execution before completing the instruction (e.g., first execution) and the initiating causes the virtual machine to enter execution at the instruction to cause the second execution. Responsive to completing the operations described herein above with references to block 410, the method may terminate.

Figure 5:
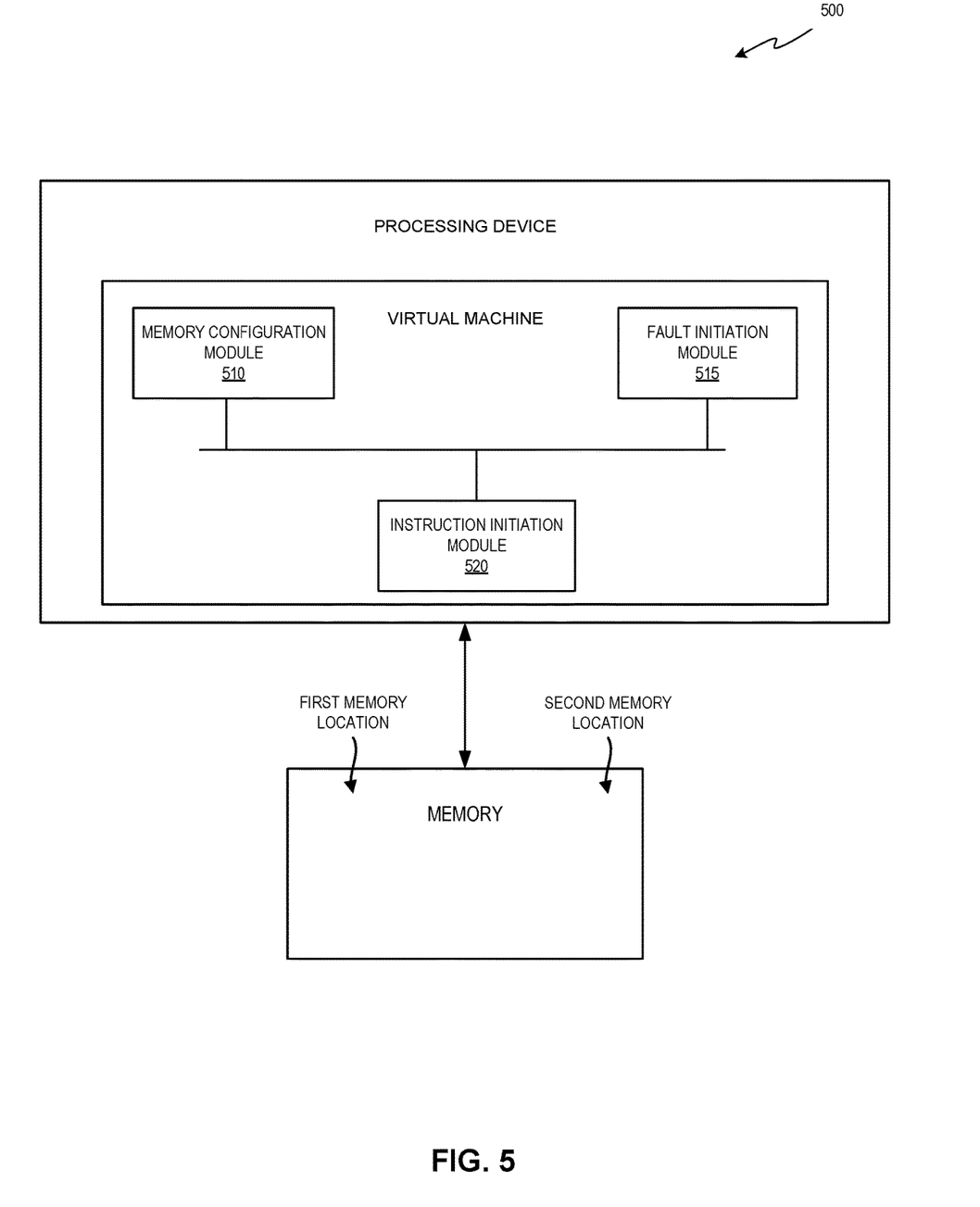
FIG. 5 depicts a flow diagram of another example method of a fault based communication channel between a virtual machine and the hypervisor, in accordance with one or more aspects of the present disclosure.

FIG. 5 depicts a block diagram of a computer system 500 operating in accordance with one or more aspects of the present disclosure. Computer system 500 may be the same or similar to computing system 100 of FIG. 1, and may include one or more processors and one or more memory devices. In the example shown, computer system 500 may include a virtual machine with a memory configuration module 510, a fault initiation module 515, and an instruction initiation module 520.

Memory configuration module 510 may enable a processor executing the virtual machine to configure a first memory location to map to a virtual device (e.g., input output (IO) device) and a second memory location to map to guest main memory (e.g., guest physical memory)

Fault initiation module 515 may enable the processor executing the virtual machine to initiate a fault that causes a hypervisor to perform a computing task for the virtual machine. The fault may be initiated by a first execution of an instruction referencing a register of a virtual processor. The register may indicate the first memory location and may be updated after the fault to indicate the second memory location. The fault may be a page fault that the virtual machine (e.g., a virtual machine process) intentionally initiates to signal the hypervisor to perform the computing task for the virtual machine. In an example, the register of the virtual processor may be updated by the virtual machine to store a pointer value of the first memory location and the register may be updated by the hypervisor after the fault to include a pointer value of the second memory location. Updating the register may involve the hypervisor executing a clobber operation to overwrite the pointer value of the first memory location with a pointer value of the second memory location. In one example, the first memory location may be a pointer to a guest memory page that is mapped to a virtual device to implement Memory Mapped IO (MMIO), and performing the computing task may involve the hypervisor emulating a feature of the virtual device.

Instruction initiation module 520 may enable the processor to cause the virtual machine to perform a second execution of the instruction. In one example, the first execution accesses the first memory location to signal the hypervisor to perform the computing task and the second execution accesses scratch space at the second memory location without signaling the hypervisor to perform the task. The instruction of the first execution and the instruction of the second execution may be identical and may include a reference to the register. The register may store a pointer value that is changed after the first execution and before the second execution, which causes the second execution of the instruction to access the second memory location instead of the first memory location. The first execution and the second execution of the instruction may be sequentially and consecutively executed by the virtual processor. When the fault is generated, the virtual machine may exit execution before completing the instruction (e.g., first execution) and the initiating may cause the virtual machine to re-enter execution at the instruction causing the second execution of the instruction.

Figure 6:
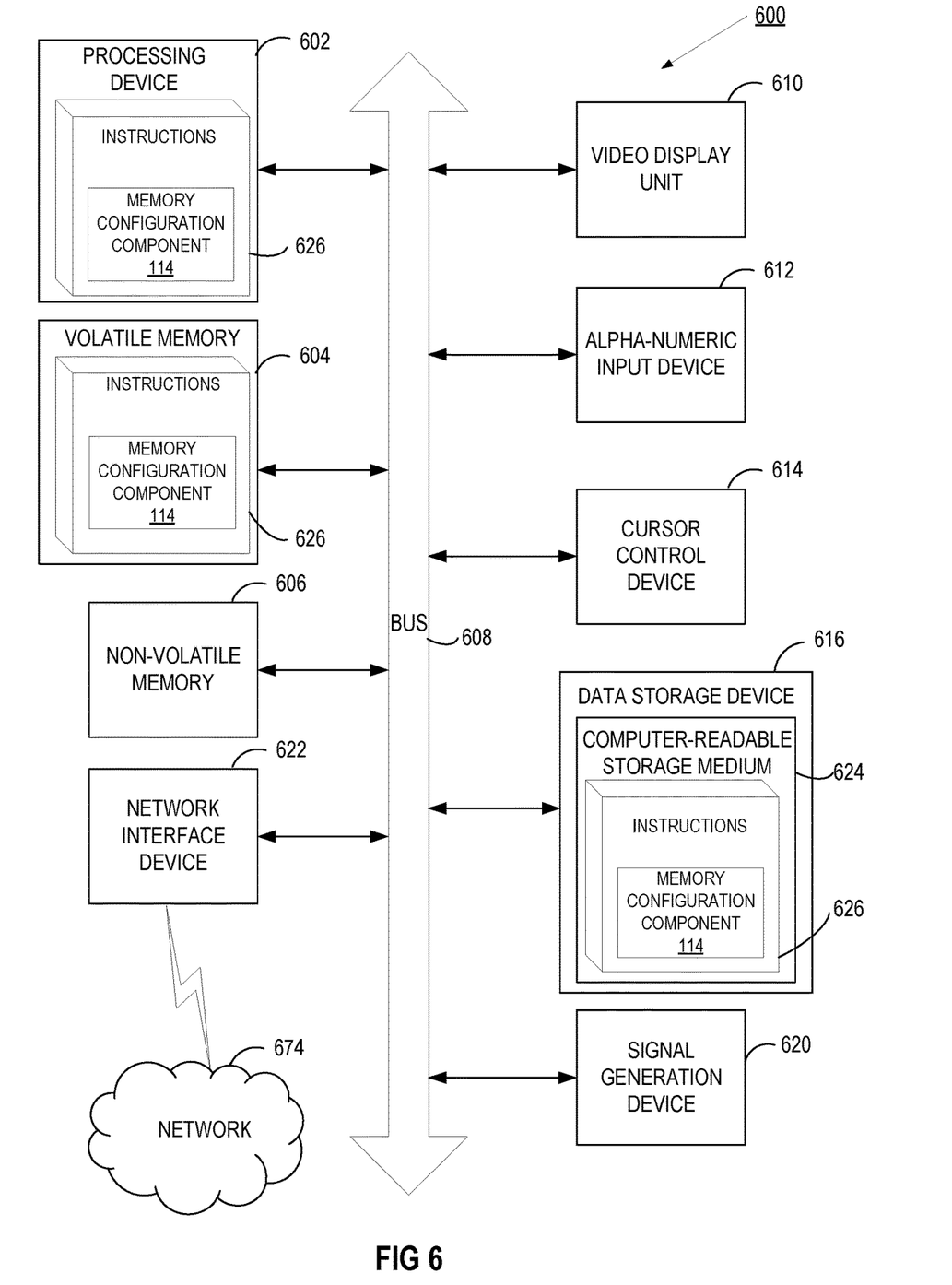
FIG. 6 depicts a block diagram of an illustrative computing device operating in accordance with the examples of the present disclosure.

FIG. 6 depicts a block diagram of a computer system 600 operating in accordance with one or more aspects of the present disclosure. In various illustrative examples, computer system 600 may correspond to computing system 100 of FIG. 1. Computer system 600 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical environment, but requests for a hard disk or memory may be managed by a virtualization layer of a computing device to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alphanumeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions for implementing method 300 or 400 and for encoding components 112, 114, and 116 of FIG. 2.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

Example 1 is method comprising: configuring, by a hypervisor executed by a processing device, a first memory location to generate one or more faults when accessed by a virtual machine process, wherein the first memory location is mapped to a device and a second memory location is mapped to memory; detecting, by the hypervisor, a fault caused by a first execution of an instruction of the virtual machine process, wherein the instruction comprises a reference to a register comprising the first memory location; responsive to the detecting the fault, the hypervisor performing a computing task for the virtual machine process and updating the register to comprise the second memory location; and initiating, by the hypervisor, a second execution of the instruction of virtual machine process, wherein the second execution of the instruction accesses the second memory location.

Example 2 is a method of example 1, wherein the fault comprises a page fault that the virtual machine process initiates to signal the hypervisor to perform the computing task for the virtual machine process.

Example 3 is a method of example 1, wherein the first memory location comprises a pointer to a guest memory page that is mapped to a virtual device, and wherein performing the computing task comprises the hypervisor emulating the virtual device.

Example 4 is a method of example 1, wherein the processing device generates the fault and exits execution of the virtual machine process during the first execution of the instruction, and wherein the initiating causes the virtual machine process to enter execution at the instruction to cause the second execution.

Example 5 is a method of example 1, wherein the instruction of the first execution and the instruction of the second execution are identical and comprise the reference to the register, and wherein the register comprises a pointer value that is changed after the first execution and before the second execution.

Example 6 is a method of example 1, wherein the first execution and the second execution of the instruction are sequentially executed by a virtual processor, and wherein the first execution accesses the first memory location to signal the hypervisor to perform the computing task and the second execution accesses scratch space at the second memory location without signaling the hypervisor to perform the task.

Example 7 is a method of example 1, wherein the register comprises a register of a virtual processor that comprises a pointer value of the first memory location, and wherein updating the register comprises the hypervisor executing a clobber operation to overwrite the pointer value with a pointer value of the second memory location.

Example 8 is a method of example 1, wherein configuring the first memory location to cause a fault, comprises the hypervisor updating a host page table to mark a page table entry that corresponds to the first memory location as unavailable, wherein unavailable comprises one or more of reserved, write protected, or non-present.

Example 9 is a system comprising: a memory; and a processing device communicably coupled to the memory, the processing device to: configure, by a hypervisor, a first memory location to generate one or more faults when accessed by a virtual machine process, wherein the first memory location is mapped to a device and a second memory location is mapped to memory; detect, by the hypervisor, a fault caused by a first execution of an instruction of the virtual machine process, wherein the instruction comprises a reference to a register comprising the first memory location; responsive to the detecting, the hypervisor to perform a computing task for the virtual machine process and to update the register to comprise the second memory location; and initiate, by the hypervisor, a second execution of the instruction of virtual machine process, wherein the second execution of the instruction accesses the second memory location.

Example 10 is a system of example 9, wherein the fault comprises a page fault that the virtual machine process initiates to signal the hypervisor to perform the computing task for the virtual machine process.

Example 11 is a system of example 9, wherein the first memory location comprises a pointer to a guest memory page that is mapped to a virtual device, and wherein to perform the computing task, the processing device is to emulate the virtual device.

Example 12 is a system of example 9, wherein the processing device generates the fault and exits execution of the virtual machine process during the first execution of the instruction, and wherein to initiate the processing device is to cause the virtual machine process to enter execution at the instruction to cause the second execution.

Example 13 is a system of example 9, wherein the instruction of the first execution and the instruction of the second execution are identical and comprise the reference to the register, and wherein the register comprises a pointer value that is changed after the first execution and before the second execution.

Example 14 is a system of example 9, wherein the first execution and the second execution of the instruction are sequentially executed by a virtual processor, and wherein the first execution accesses the first memory location to signal the hypervisor to perform the computing task and the second execution accesses scratch space at the second memory location without signaling the hypervisor to perform the task.

Example 15 is a non-transitory machine-readable storage medium storing instructions which, when executed, cause a processing device to perform operations comprising: identifying a first memory page mapped to a device and a second memory page mapped to main memory; configuring the first memory page to generate one or more faults when accessed by a virtual machine; detecting, by a hypervisor, a fault caused by a first execution of an instruction of the virtual machine, wherein the instruction comprises a reference to a register comprising a pointer to the first memory page; responsive to the detecting the fault, the hypervisor performing a computing task for the virtual machine and updating the register to comprise a pointer to the second memory page; and initiating a second execution of the instruction of virtual machine, wherein the second execution of the instruction accesses the second memory page.

Example 16 is a non-transitory machine-readable storage medium of example 15, wherein the register comprises a register of a virtual processor that comprises a pointer value to first memory page, and wherein updating the register comprises the hypervisor executing a clobber operation to overwrite the pointer value with a pointer value to the second memory page.

Example 17 is a non-transitory machine-readable storage medium of example 15, wherein configuring the first memory page to cause a fault, comprises the hypervisor updating a host page table to mark a page table entry that corresponds to the first memory page as unavailable, wherein unavailable comprises one or more of reserved, write protected, or non-present.

Example 18 is a non-transitory machine-readable storage medium of example 15, wherein the fault comprises a page fault that the virtual machine initiates to signal the hypervisor to perform the computing task for the virtual machine.

Example 19 is a non-transitory machine-readable storage medium of example 15, wherein the first memory page comprises a guest memory page that is mapped to a virtual device, and wherein performing the computing task comprises the hypervisor emulating the virtual device.

Example 20 is a non-transitory machine-readable storage medium of example 15, wherein the processing device generates the fault and exits execution of the virtual machine during the first execution of the instruction, and wherein the initiating causes the virtual machine to enter execution at the instruction to cause the second execution.

Example 21 is a method comprising: identifying a first memory page mapped to a device and a second memory page mapped to main memory; configuring the first memory page to generate one or more faults when accessed by a virtual machine; detecting, by a hypervisor, a fault caused by a first execution of an instruction of the virtual machine, wherein the instruction comprises a reference to a register comprising a pointer to the first memory page; responsive to the detecting the fault, the hypervisor performing a computing task for the virtual machine and updating the register to comprise a pointer to the second memory page; and initiating a second execution of the instruction of virtual machine, wherein the second execution of the instruction accesses the second memory page.

Example 22 is a method of example 21, wherein the register comprises a register of a virtual processor that comprises a pointer value to first memory page, and wherein updating the register comprises the hypervisor executing a clobber operation to overwrite the pointer value with a pointer value to the second memory page.

Example 23 is a method of example 21, wherein configuring the first memory page to cause a fault, comprises the hypervisor updating a host page table to mark a page table entry that corresponds to the first memory page as unavailable, wherein unavailable comprises one or more of reserved, write protected, or non-present.

Example 24 is a method of example 21, wherein the fault comprises a page fault that the virtual machine initiates to signal the hypervisor to perform the computing task for the virtual machine.

Example 25 is a method of example 21, wherein the first memory page comprises a guest memory page that is mapped to a virtual device, and wherein performing the computing task comprises the hypervisor emulating the virtual device.

Example 26 is a method of example 21, wherein the processing device generates the fault and exits execution of the virtual machine during the first execution of the instruction, and wherein the initiating causes the virtual machine to enter execution at the instruction to cause the second execution.

Example 27 is a method of example 21, wherein the fault comprises a page fault that the virtual machine initiates to signal the hypervisor to perform the computing task for the virtual machine.

Example 28 is a method of example 21, wherein the first memory page comprises a guest memory page that is mapped to a virtual device, and wherein performing the computing task comprises the hypervisor emulating the virtual device.

Example 29 is a method of example 21, wherein the processing device generates the fault and exits execution of the virtual machine during the first execution of the instruction, and wherein the initiating causes the virtual machine to enter execution at the instruction to cause the second execution.

Example 30 is a device comprising: a means for configuring, by a hypervisor executed by a processing device, a first memory location to generate one or more faults when accessed by a virtual machine process, wherein the first memory location is mapped to a device and a second memory location is mapped to memory; a means for detecting, by the hypervisor, a fault caused by a first execution of an instruction of the virtual machine process, wherein the instruction comprises a reference to a register comprising the first memory location; a means for performing a computing task for the virtual machine process and updating the register to comprise the second memory location responsive to the detecting the fault; and a means for initiating, by the hypervisor, a second execution of the instruction of virtual machine process, wherein the second execution of the instruction accesses the second memory location.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "identifying," "configuring," "detecting," "performing," "initiating," "deriving," "creating," "generating," "using," "accessing," "executing," "obtaining," "storing," "transmitting," "providing," "establishing," "receiving," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 300 or 400 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
configuring, by a hypervisor executed by a processing device, a first memory location to generate one or more faults when accessed by a virtual machine process, wherein the first memory location is mapped to a device and a second memory location is mapped to memory;
detecting, by the hypervisor, a fault caused by a first execution of an instruction of the virtual machine process, wherein the first execution accesses the first memory location to signal the hypervisor to perform a computing task, and the instruction comprises a reference to a register comprising the first memory location;
responsive to the detecting the fault, the hypervisor performing the computing task for the virtual machine process and updating the register to comprise the second memory location; and
initiating, by the hypervisor, a second execution of the instruction of the virtual machine process, wherein the second execution of the instruction accesses scratch space at the second memory location without signaling the hypervisor to perform the task.

2. The method of claim 1, wherein the fault comprises a page fault that the virtual machine process initiates to signal the hypervisor to perform the computing task for the virtual machine process.

3. The method of claim 1, wherein the first memory location comprises a pointer to a guest memory page that is mapped to a virtual device, and wherein performing the computing task comprises the hypervisor emulating the virtual device.

4. The method of claim 1, wherein the processing device generates the fault and exits execution of the virtual machine process during the first execution of the instruction, and wherein the initiating causes the virtual machine process to enter execution at the instruction to cause the second execution.

5. The method of claim 1, wherein the instruction of the first execution and the instruction of the second execution are identical and comprise the reference to the register, and wherein the register comprises a pointer value that is changed after the first execution and before the second execution.

6. The method of claim 1, wherein the first execution and the second execution of the instruction are sequentially executed by a virtual processor.

7. The method of claim 1, wherein the register comprises a register of a virtual processor that comprises a pointer value of the first memory location, and wherein updating the register comprises the hypervisor executing a clobber operation to overwrite the pointer value with a pointer value of the second memory location.

8. The method of claim 1, wherein configuring the first memory location to cause a fault, comprises the hypervisor updating a host page table to mark a page table entry that corresponds to the first memory location as unavailable, wherein an unavailable marking represents one or more of reserved, write protected, or non-present.

9. A system comprising:
a memory; and
a processing device communicably coupled to the memory, the processing device to:
configure, by a virtual machine, a first memory location to map to a virtual device and a second memory location to map to guest main memory;
initiate, by the virtual machine, a fault that causes a hypervisor to perform a computing task for the virtual machine, wherein the fault is initiated by a first execution of an instruction referencing a register of a virtual processor, wherein the register comprises the first memory location and is updated after the fault to comprise the second memory location, wherein the first execution accesses the first memory location to signal the hypervisor to perform the computing task; and
perform, by the virtual machine, a second execution of the instruction, wherein the second execution of the instruction accesses the second memory location, wherein the second execution accesses scratch space at the second memory location without signaling the hypervisor to perform the task.

10. The system of claim 9, wherein the fault comprises a page fault that the virtual machine initiates to signal the hypervisor to perform the computing task for the virtual machine.

11. The system of claim 9, wherein the first memory location comprises an address of a guest memory page that is mapped to the virtual device, and wherein to perform the computing task, the processing device is to emulate the virtual device.

12. The system of claim 9, wherein the processing device is to generate the fault and exit execution of the virtual machine during the first execution of the instruction, and wherein to initiate the processing device is to cause the virtual machine to enter execution at the instruction to cause the second execution.

13. The system of claim 9, wherein the instruction of the first execution and the instruction of the second execution are identical and comprise the reference to the register, and wherein the register comprises a pointer value that is changed after the first execution and before the second execution.

14. The system of claim 9, wherein the first execution and the second execution of the instruction are sequentially executed by the virtual processor of the virtual machine.

15. A non-transitory machine-readable storage medium storing instructions which, when executed, cause a processing device to perform operations comprising:
identifying a first memory page mapped to a device and a second memory page mapped to main memory;
configuring the first memory page to generate one or more page faults when accessed by a virtual machine;
detecting, by a hypervisor, a page fault caused by a first execution of an instruction of the virtual machine, wherein the first execution accesses a first memory location to signal the hypervisor to perform a computing task, and the instruction comprises a reference to a register comprising a pointer to the first memory page;
responsive to the detecting the page fault, the hypervisor performing the computing task for the virtual machine and updating the register to comprise a pointer to the second memory page; and
initiating a second execution of the instruction of the virtual machine, wherein the second execution of the instruction accesses scratch space at the second memory page without signaling the hypervisor to perform the task.

16. The non-transitory machine-readable storage medium of claim 15, wherein the register comprises a register of a virtual processor that comprises a pointer value to first memory page, and wherein updating the register comprises the hypervisor executing a clobber operation to overwrite the pointer value with a pointer value to the second memory page.

17. The non-transitory machine-readable storage medium of claim 15, wherein configuring the first memory page to cause one or more page faults, comprises the hypervisor updating a host page table to mark a page table entry that corresponds to the first memory page as unavailable, wherein unavailable comprises one or more of reserved, write protected, or non-present.

18. The non-transitory machine-readable storage medium of claim 15, wherein the page fault comprises a page fault that the virtual machine initiates to signal the hypervisor to perform the computing task for the virtual machine.

19. The non-transitory machine-readable storage medium of claim 15, wherein the first memory page comprises a guest memory page that is mapped to a virtual device, and wherein performing the computing task comprises the hypervisor emulating the virtual device.

20. The non-transitory machine-readable storage medium of claim 15, wherein the operations further comprise generating the fault and exiting execution of the virtual machine during the first execution of the instruction, and wherein the initiating causes the virtual machine to enter execution at the instruction to cause the second execution.

* * * * *